United States Patent
Tanaka

[19]

[11] Patent Number: 6,166,743
[45] Date of Patent: *Dec. 26, 2000

[54] METHOD AND SYSTEM FOR IMPROVED Z-TEST DURING IMAGE RENDERING

[75] Inventor: Greg L. Tanaka, Sunnyvale, Calif.

[73] Assignee: Silicon Magic Corporation, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/820,541

[22] Filed: Mar. 19, 1997

[51] Int. Cl.$^7$ .................................................. G06T 15/40
[52] U.S. Cl. ........................... 345/422; 345/506; 345/139
[58] Field of Search ................................... 345/422, 139, 345/506

[56] References Cited

U.S. PATENT DOCUMENTS

| | | | |
|---|---|---|---|
| 5,613,050 | 3/1997 | Hochmuth et al. | 345/422 |
| 5,760,780 | 6/1998 | Larson et al. | 345/422 |
| 5,764,243 | 6/1998 | Baldwin | 345/506 |
| 5,798,770 | 8/1998 | Baldwin | 345/506 |
| 5,835,096 | 11/1998 | Baldwin | 345/430 |

*Primary Examiner*—Jeffery Brier
*Assistant Examiner*—Motilewa Good-Johnson
*Attorney, Agent, or Firm*—Sawyer Law Group LLP

[57] ABSTRACT

Aspects for effectively improving the throughput in a rasterization pipeline for image rendering in a computer system are provided. A method aspect includes receiving data for a chosen number of pixels in a Z-test mechanism of the rasterization pipeline, performing Z-test determinations for the chosen number of pixels in a same clock cycle to achieve faster processing in the Z-test mechanism than other portions of the rasterization pipeline, and tagging the chosen number of pixels based upon the Z-test determinations to indicate pass/fail status for rendering. A circuit aspect includes at least one memory device for storing pixel data, a Z-test mechanism, the Z-test mechanism within the rasterization pipeline and coupled to the at least one memory device for determining a pass/fail rendering status for a plurality of pixels received in parallel from the at least one memory means, and a plurality of mechanisms forming a portion of the rasterization pipeline following the Z-test mechanism, the plurality of mechanisms for processing pixel data with a pass status sequentially.

22 Claims, 3 Drawing Sheets

METHOD AND SYSTEM FOR IMPROVED Z-TEST DURING IMAGE RENDERING

FIELD OF THE INVENTION

The present invention relates to the field of image rendering on computer screens, and more particularly, to improving the rasterization of images.

BACKGROUND OF THE INVENTION

Computer systems are increasingly important components in providing images for modeling, predicting, and experimenting with events in many situations. Examples of such situations include flight simulators for training exercises, computer aided drafting and design (CAD) applications for engineers and architects, animated activities in movies and video games, and diagnostic medical devices for physicians. Improvements in display systems, including the development of high resolution display screens, allows greater precision and clarity in displaying geometric objects.

In general, display systems comprise three components: a frame buffer, a monitor, and a display controller. The frame buffer is a digital memory for storing the image to be displayed as a series of binary values. The monitor includes a screen having an array of picture elements, i.e., pixels. Each pixel represents a dot on the screen and can be programmed to a particular color or intensity with thousands of pixels programmed to represent a displayed image. The frame buffer stores these pixel values. The display controller typically is the interface for passing the contents of the frame buffer to the monitor by converting the data from the frame buffer to a video signal for display by the monitor.

Typically, a 3D graphics rendering device employing a frame buffer also stores additional information per pixel (e.g., alpha values representing a blending function, Z (depth) values representing a pixel's distance from the viewer, etc.) not required by the monitor/display. Rendering of an image, including determinations of Z values, is often done sequentially, one pixel at a time through a rasterization pipeline. While improvements in processor speeds tends to improve rendering times, limitations of sequential processing still restrict fast rendering. Attempts to use multiple processors to perform rendering in parallel fashion also tend to improve rendering times, however incorporation of multiple processors increases system size and costs.

What is needed is an efficient system to improve effective throughput of pixel rendering in graphics processing.

SUMMARY OF THE INVENTION

The present invention addresses the need for faster rendering and provides method, circuit, and system aspects for improved rasterization. In accordance with one aspect of the present invention, a method for effectively improving the throughput in a rasterization pipeline for image rendering in a computer system includes receiving data for a chosen number of pixels in a Z-test mechanism of the rasterization pipeline. The method further includes performing Z-test determinations for the chosen number of pixels in a same clock cycle to achieve faster processing in the Z-test mechanism than other portions of the rasterization pipeline, and tagging the chosen number of pixels based upon the Z-test determinations to indicate pass/fail status for rendering.

Performing Z-test determinations further includes comparing the data for the chosen number of pixels with results from a set-up portion of the rasterization pipeline after interpolation. Additionally, the method includes omitting processing through subsequent rasterization pipeline processing of any pixel in the chosen number of pixels tagged with a fail status.

In a circuit aspect, the circuit includes at least one memory device for storing pixel data, a Z-test mechanism, the Z-test mechanism within the rasterization pipeline and coupled to at least one memory device for determining a pass/fail rendering status for a plurality of pixels received in parallel from at least one memory device, and a plurality of mechanisms (for processing pixel data with a pass status sequentially) forming a portion of the rasterization pipeline following the Z-test mechanism. Additionally, the Z-test mechanism further includes a plurality of comparison mechanisms, while the circuit further includes a set-up mechanism within the rasterization pipeline for performing calculations prior to the Z-test mechanism and coupled to the plurality of comparison mechanisms for providing initial calculation data interpolated for comparison.

In a system aspect, a computer system with improved rasterization processing during image rendering includes a central processing unit, CPU, the CPU providing rendering commands and data, and core logic coupled to the CPU for transferring the rendering commands and data. The computer system further includes graphics processing means coupled to the core logic and receiving the rendering commands and data, the graphics processing means comprising a rasterization pipeline, the rasterization pipeline including a Z-test mechanism, the Z-test mechanism processing a plurality of pixels at a faster rate than other portions of the rasterization pipeline to determine a pass/fail status for each of the plurality of pixels and improve the effective throughput in the rasterization pipeline.

With the aspects of the present invention, several advantages in rendering 3D images are achieved. Faster effective throughput in the rasterization pipeline occurs as a result of performing Z-tests at a faster rate than other operations of the rasterization pipeline and omission of failed pixel processing in the pipeline. Further, the increase in effective throughput provides more efficient rasterization in a straightforward manner. These and other advantages of the aspects of the present invention will be more fully understood in conjunction with the following detailed description and accompanying drawings.

DETAILED DESCRIPTION

The present invention relates to improved rasterization of three-dimensional graphics in computer systems. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
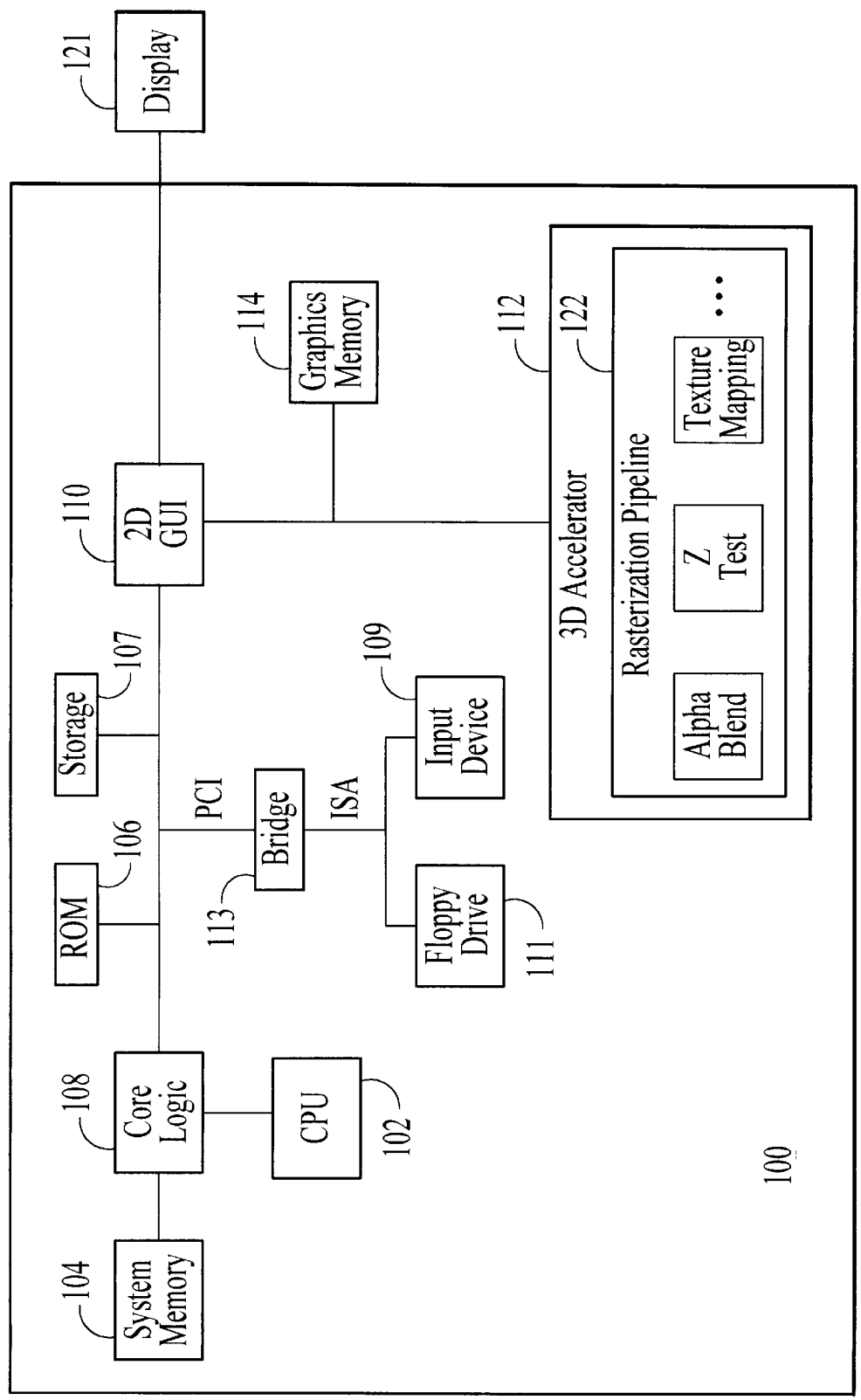
FIG. 1 illustrates a block diagram of a computer system including a rasterization pipeline in accordance with the present invention.

Referring to FIG. 1, a computer system 100 suitable for the present invention includes a central processing unit (CPU) 102 coupled to system memory 104, e.g. random access memory (RAM), and ROM 106, via core logic 108. System memory 104 suitably stores information and instructions executed by CPU 102. System memory 104 further stores temporary variables and other intermediate information during execution of instructions by CPU 102, as is well appreciated by those skilled in the art. Read only memory (ROM) or other form of static storage device 106 preferably stores static information and instructions for CPU 102. Other storage devices 107, such as a hard disk drive, are also suitably included for storing information and instructions.

As shown, core logic 108 suitably acts as a transfer agent between CPU 102 and graphics processing components, 2D GUI (two-dimensional graphical user interface) component 110 and 3D (three dimensional) accelerator component 112, which are shown as separate components, but which may combined in some system architectures. In addition, other system components, including storage device(s) 107, are coupled to the CPU 102 via core logic 108, with input device(s) 109, such as a mouse, keyboard, or joystick, and floppy disk drive(s) 111, connected via bridge agent 113. A display device 121, such as a cathode ray tube (CRT) device or a liquid crystal display (LCD) device, suitably displays information to a computer user.

In displaying three-dimensional graphics on the display device 121, computer system 100 performs numerous tasks utilizing the graphics processing components 110 and 112. Typically, pixel data that has undergone transform or geometry manipulations controlled by CPU 102, such as transversal modeling transform, primitive clipping, lighting, viewing transform, and more clipping, as is well appreciated by those skilled in the art, is transferred via core logic 108 to the 2D GUI component 110. 3D specific commands and data are then suitably transferred to the 3D accelerator component 112, which includes a rasterization pipeline 122. The 3D accelerator 112 suitably stores rendered frames in graphics memory component 114, e.g., a single unified memory component or a chosen number of separate memory components, with the rendered frames then processed by the 2D GUI component 110 and presented on the display device 121. The 3D accelerator 112 renders frames through the rasterization pipeline 122, which includes several pixel processing mechanisms, e.g., texture mapping, alpha blending, shading, etc. A primary processing mechanism included in the rasterization pipeline 122 is a Z-test mechanism for determining depth information for the pixel data.

Figure 2:
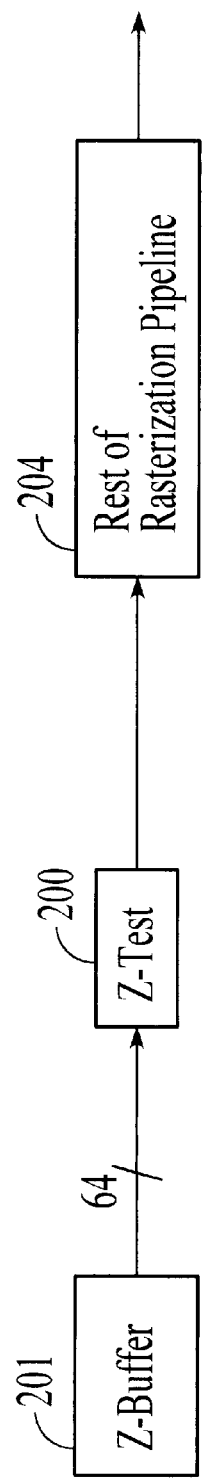
FIG. 2 illustrates a block diagram of a prior art Z-test mechanism arrangement within a rasterization pipeline.

An overall block diagram of a typical Z-test mechanism 200 is shown in FIG. 2. Usually, after some set-up operations, such as delta calculations, color information determinations, etc., are performed, the results of the calculations are transferred from a Z buffer 201 via a 64-bit bus to be utilized by the Z-test mechanism 200. For each pixel, the Z-test mechanism 200 typically performs one comparison per clock cycle to determine whether the current pixel should be rendered. A suitable algorithm for performing depth calculations, i.e., Z-tests, is provided in E. Catmull's *A Subdivision Algorithm for Computer Display of Curved Surfaces*, Ph.D. thesis, report UTEC-CSC-74-133, Computer Sciences Department, University of Utah, Salt Lake City, Utah, December 1974. Z-tests, in general, involve comparisons of depth values for pixels in conjunction with values calculated during set-up to determine whether a currently tested pixel is seen in the image.

Upon completion of processing by Z-test mechanism 200, in addition to the transmission of pixel data requiring rendering, 'bubbles' or blank data are transmitted for each pixel not needing to be rendered as determined by the depth comparison of the Z-test mechanism 200, as is well appreciated by those skilled in the art. Since the throughput of the Z-test mechanism 200 and the rest of the rasterization pipeline 204 is equal, the 'bubbles' provide a simple means of maintaining synchronization within the pipeline.

Figure 3:
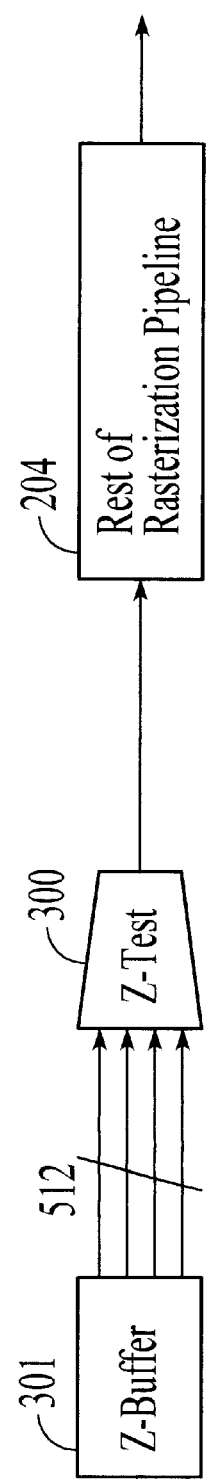
FIG. 3 illustrates a block diagram of Z-test mechanism in accordance with the present invention.
Figure 4:
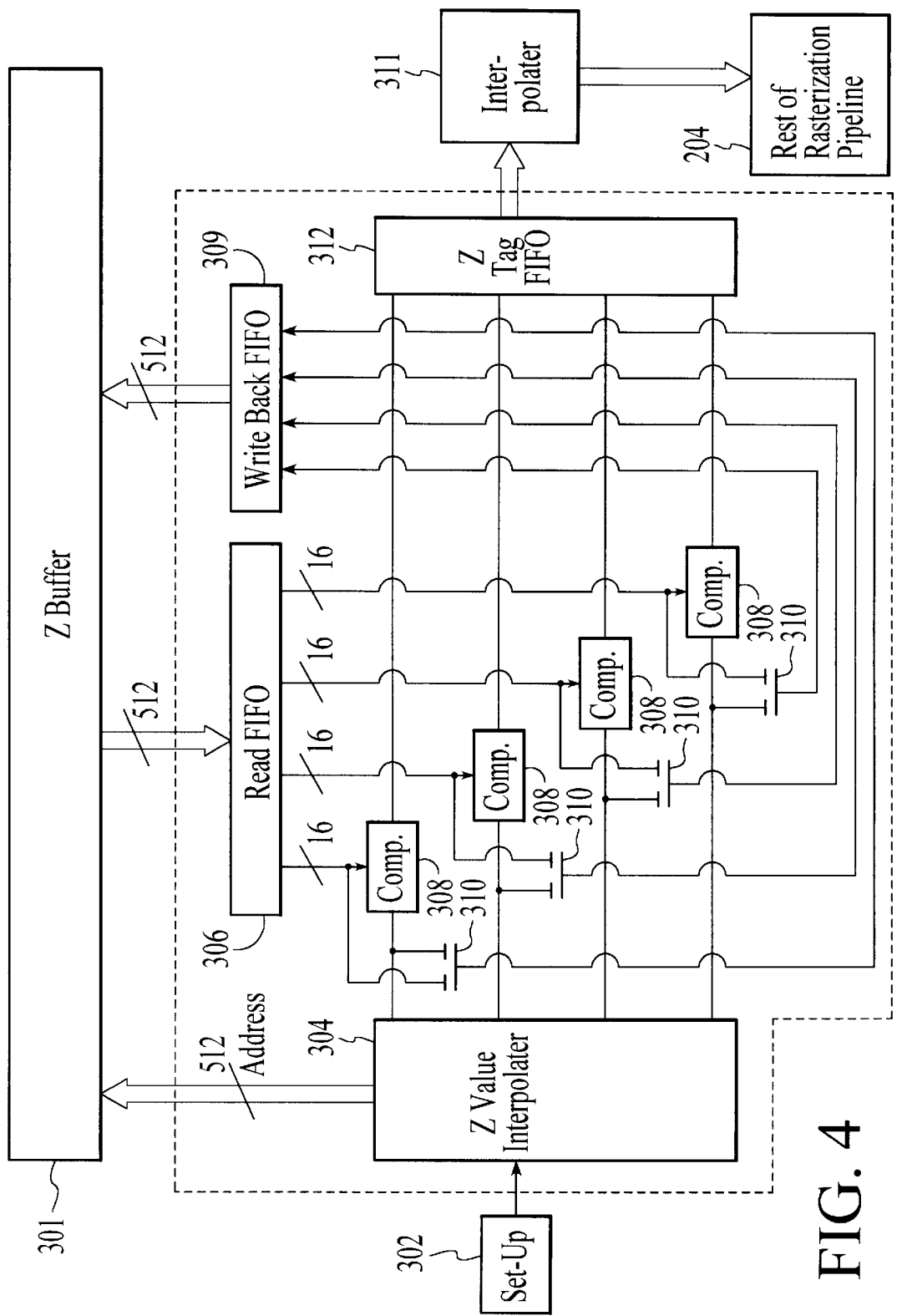
FIG. 4 illustrates the Z-test mechanism of FIG. 3 in greater detail.

While rendering of pixel data is achieved with the approach illustrated in FIG. 2, efficiency is hampered by the wasted processing of the 'bubbles' in the pipeline that occurs, since the bubbles are never actually rendered. In accordance with the present invention, faster rasterization effectively occurs by only processing pixels that will be rendered following Z-test. FIG. 3 illustrates a block diagram of a system for achieving faster rasterization of pixel data. As shown, a Z-test mechanism 300 receives multiple parallel inputs from a memory unit, e.g., a Z buffer, 301, of graphics memory component 114 (FIG. 1). Suitably, an expanded, internal data bus, e.g., a 512 bit bus, supports transfer of parallel data for up to 32 Z values of the pixels to the Z-test mechanism 300 when each Z-test uses 2 bytes per pixel. With the parallel arrangement of the present invention, multiple Z-tests are performed per cycle. Thus, Z-testing occurs faster than the operations of other portions of the rasterization pipeline 204. Alternatively to the use of a parallel input, the advantageous faster occurrence of Z-tests could also be achieved by maintaining a serial input but having the Z-tests run faster, e.g., by clocking the Z-test mechanism 300 at a faster rate than the rest of the rasterization pipeline 204. While the rest of the rasterization pipeline 204 still operates on one pixel at a time, the multiple processing arrangement of the Z-test mechanism 300 proceeds faster and allows the rest of the rasterization pipeline 204 to operate on only those pixels that will be rendered, as described in more detail with reference to FIG. 4.

The Z-test mechanism 300 suitably receives results from a set-up portion 302 of the rasterization pipeline 122 (FIG. 1) that precedes the Z-test mechanism 300. Set-up portion 302 performs typical preliminary operations, including delta calculations, determining starting values and distances between points of the object, e.g., triangle, being rasterized, providing color information, x-y information, and Z value information, as is well understood by those skilled in the art. Further, the set-up portion 302 typically indicates to the Z-test mechanism 300 where to fetch data from the Z buffer 301 for each of the pixels being tested.

A read FIFO (first-in first-out) 306 suitably receives the Z values from Z buffer 301 for comparison against interpolated Z values from Z value interpolation unit 304. Comparator devices 308, with preferably one comparator device per pixel to be rendered, suitably perform the comparisons, and the result of the comparisons determines whether a current or new Z value is written back to the Z buffer 301 through write FIFO 309 by utilizing multiplexor logic 310. As illustrated, the Z values are transferred to comparator devices 308 via 16-bit buses, but of course, other bus sizes, including 32-bit buses, may be used. Further, write back FIFO 309 could be utilized to write back only new values to the Z buffer 301 by incorporating more complex control logic, if desired, as is well appreciated by those skilled in the art.

Through the use of the multiple comparator devices 308, determinations of whether each pixel should be rendered occurs for a chosen number of pixels at a time. As an example, a chosen number of four comparator devices 308 would allow four comparisons to occur at the same time. With a two bit value designating four levels of depth, i.e., Z values ranging from 0–3, set-up portion 302 suitably determines that a Z value less than two indicates that a pixel should be rendered. Comparator devices 308 suitably compare the Z values to the depth range to indicate a pass/fail rendering status for each pixel.

Thus, for a first set of parallel comparisons of four pixels (e.g., pixels 0–3), when pixels 0, 2, and 3 should be rendered, the comparison provides a suitable indication by inclusion of a tag, e.g., a set bit, indicating their 'pass' status. Conversely, when pixel 1 should not be rendered, the comparison provides a suitable indication by inclusion of a tag, e.g., a reset bit, indicating the 'fail' status. The tags are preferably stored in a Z tag FIFO 312 coupled to the comparator devices 308 to receive the results of the comparison. Similarly, in a second set of parallel comparisons of four pixels (e.g., pixels 4–7), when pixels 4–7 should not be rendered, tags indicating their fail status are suitably provided as a result of the comparison.

The Z tag FIFO 312 suitably stores the tag data following Z-test until an appropriate time of transfer occurs, since the parallel activity of the Z-test mechanism 300 does not match the serial activity of the rest of the rasterization pipeline 204. Before transmitting the data to the rest of the rasterization pipeline via interpolation unit 314, preferably the tag data is utilized to omit the pixels not requiring rendering from the rest of the rasterization pipeline 204. By way of example, in a FIFO allowing incrementing by values of one or two, tag data is suitably utilized to control the incrementing. The tag data may be utilized via combinational logic, e.g. a digital differential analyzer (DDA), such as to act as inputs into a multiplexor device coupled to an adder with feedback through a register, to allow controlled incrementing as the data is transferred to the rest of the pipeline, as is well appreciated by those skilled in the art. Alternatively, rather than skipping on a pixel-by-pixel basis, skipping may be performed on entire spans, with an entire span skipped when all the pixels in that span fail.

Thus, the sequence of pixels processed by the rest of the rasterization pipeline 204 when the present invention is utilized is a sequence of only those opixels that 'pass' the Z-test and should be rendered. This provides an effective improvement in throughput of actual pixel data through the rasterization pipeline.

Using the example situation to exemplify the improvement, the prior art approach would place 'bubbles' in the pipeline for the 'failing' pixels, 1 and 4–7. Thus, in a first clock cycle, pixel 0 would be processed for rendering. In a next clock cycle, a 'bubble' would replace pixel 1 and be processed through the pipeline, and so on for the rest of the eight pixels. Thus, eight cycles would be required to process three rendered pixels, 0, 2, and 3. In contrast, with the present invention, in a first cycle, pixel 0 would be processed, but in a next cycle, pixel 2 would be processed. Since the pixel 1 data, and all other 'failing' pixels, do not require rendering, they are not processed by the rest of the rasterization pipeline 204 when the present invention is utilized. Thus, rather than the eight cycles that would be required in the prior art, only three cycles are required with the present invention to achieve processing of the rendered pixels in the example set of eight pixels.

The present invention thus provides an effective increase in processing speed by eliminating 'bubbles' from the rasterization pipeline following Z-test. While adding hardware to achieve the faster Z-test, including an expanded internal data bus and increased storage space, such additions are more readily performed given the decreasing costs of most hardware devices. Further, the expanded data bus better supports faster Z-tests, including parallel inputs and write-back, than a traditionally employed 64 bit bus. The number of cycles saved with the present invention varies, and depends, of course, on the number of pixels that are not rendered. However, unless all the pixels require rendering, effectively faster rasterization occurs with the present invention.

Although the present invention has been described in accordance with the embodiments shown, one of ordinary skill in the art will recognize that there could be variations to the embodiment and those variations would be within the spirit and scope of the present invention. For example, other storage device arrangements and combinational logic may be employed to achieve the omission of failed pixels from the rasterization pipeline according to specific design needs, as is well appreciated by those skilled in the art. Accordingly, many modifications may be made by one of ordinary skill without departing from the spirit and scope of the present invention, the scope of which is defined by the following claims.

I claim:

1. A method for effectively improving the throughput in a rasterization pipeline for image rendering in a computer system, the method comprising:

receiving data for a chosen number of pixels in a Z-test mechanism of the rasterization pipeline;

performing parallel Z-test determinations for the chosen number of pixels in a same clock cycle to achieve faster processing in the Z-test mechanism than other portions of the rasterization pipeline;

tagging the chosen number of pixels based upon the Z-test determinations to indicate pass/fail status for rendering; and interpolating the chosen number of pixels according to the pass/fail status provided by the tagging.

2. The method of claim 1 wherein the step of receiving further comprises receiving data in parallel in the Z-test mechanism.

3. The method of claim 1 wherein performing Z-test determinations further comprises comparing the data for the chosen number of pixels with results from a set-up portion of the rasterization pipeline after interpolation.

4. The method of claim 1 further comprising omitting processing through subsequent rasterization pipeline processing of any pixel in the chosen number of pixels tagged with a fail status.

5. The method of claim 2 wherein the step of receiving further comprises providing an expanded data bus on which to receive the data for the chosen number of pixels in parallel.

6. A circuit for effectively improving the throughput in a rasterization pipeline for image rendering in a computer system, the circuit comprising:

at least one memory means for storing pixel data;

a Z-test mechanism, the Z-test mechanism within the rasterization pipeline and coupled to the at least one memory means for determining a pass/fail rendering status for a plurality of pixels in parallel based on Z values received in parallel from the memory means; and a plurality of mechanisms forming a portion of the rasterization pipeline following the Z-test mechanism, the plurality of mechanisms for interpolating the plurality of pixels based on the pass/fail rendering status and processing pixel data with a pass status sequentially.

7. The circuit of claim 6 wherein the Z-test mechanism further comprises a plurality of comparison means.

8. The circuit of claim 7 further comprising a set-up mechanism within the rasterization pipeline for performing calculations prior to the Z-test mechanism and coupled to the plurality of comparison means for providing initial calculation data for comparison after interpolation.

9. The circuit of claim 8 wherein the Z-test mechanism determines pass/fail status for each pixel based on the results from the plurality of comparison means.

10. The circuit of claim 9 wherein the plurality of comparison means further comprises one comparison means per pixel.

11. A computer system with improved rasterization processing during image rendering, the computer system comprising:

a central processing unit, CPU, the CPU providing rendering commands and data;

core logic coupled to the CPU for transferring the rendering commands and data; and graphics processing means coupled to the core logic and receiving the rendering commands and data, the graphics processing means comprising a rasterization pipeline, the rasterization pipeline including a Z-test mechanism, the Z-test mechanism processing a plurality of pixels at a faster rate than other portions of the rasterization pipeline to determine a pass/fail status for each of the plurality of pixels in parallel for use by an interpolation means and improve the effective throughput in the rasterization pipeline.

12. The computer system of claim 11 wherein the graphics processing means further comprises a 2D GUI and a 3D accelerator.

13. The computer system of claim 12 wherein the 3D accelerator further comprises the rasterization pipeline.

14. The computer system of claim 11 wherein the rasterization pipeline further comprises a set-up mechanism coupled to the Z-test mechanism for performing initial calculations on the pixel data.

15. The computer system of claim 14 wherein the Z-test mechanism further comprises a plurality of comparison means for comparing the pixel data to data from the set-up mechanism after interpolation to determine the pass/fail status of the plurality of pixels.

16. The computer system of claim 15 further comprising a tag storage means coupled to the plurality of comparison means for storing the pass/fail status of the plurality of pixels.

17. The computer system of claim 15 wherein the Z-test mechanism further comprises one comparison means per pixel of the plurality of pixels.

18. The computer system of claim 11 further comprising at least one memory means coupled to the graphics processing means for storing Z values for the Z-test mechanism.

19. The computer system of claim 18 further comprising an expanded data bus for coupling the at least one memory means to the rasterization pipeline.

20. The computer system of claim 19 wherein the expanded data bus further comprises a 512 bit bus.

21. The computer system of claim 16 wherein the interpolation means is coupled to the tag storage means and skips pixels on a pixel-by-pixel basis.

22. The computer system of claim 16 wherein the interpolation means is coupled to the tag storage means and skips pixels on an entire span when all of the pixels in the entire span fail.

* * * * *